(12) United States Patent
Smailey et al.

(10) Patent No.: US 11,532,054 B2
(45) Date of Patent: Dec. 20, 2022

(54) PATH OF FUNDS BLOCKCHAIN SYSTEM

(71) Applicant: Agora AltX, Phoenix, AZ (US)

(72) Inventors: Matthew Smailey, Phoenix, AZ (US); Nico R. Willis, Phoenix, AZ (US); Abrarahmed Maniyar, Phoenix, AZ (US); Kyle Walker, Washington, DC (US)

(73) Assignee: Agora AltX, Phoenix, AZ (US)

( * ) Notice: Subject to any disclaimer, the term of this patent is extended or adjusted under 35 U.S.C. 154(b) by 155 days.

(21) Appl. No.: 16/797,714

(22) Filed: Feb. 21, 2020

(65) Prior Publication Data

US 2020/0273116 A1 Aug. 27, 2020

Related U.S. Application Data

(60) Provisional application No. 62/808,427, filed on Feb. 21, 2019.

(51) Int. Cl.
| | | |
|---|---|---|
| *G06Q 40/00* | (2012.01) | |
| *G06Q 10/10* | (2012.01) | |
| *G06Q 40/02* | (2012.01) | |
| *H04L 9/06* | (2006.01) | |
| *G06F 16/23* | (2019.01) | |
| *G06Q 40/06* | (2012.01) | |
| *H04L 9/00* | (2022.01) | |

(52) U.S. Cl.
CPC ......... *G06Q 40/12* (2013.12); *G06F 16/2379* (2019.01); *G06Q 10/10* (2013.01); *G06Q 40/02* (2013.01); *G06Q 40/06* (2013.01); *H04L 9/0637* (2013.01); *G06Q 2220/00* (2013.01); *H04L 9/50* (2022.05)

(58) Field of Classification Search
CPC ........ G06Q 40/12; G06Q 10/10; G06Q 40/02; G06Q 40/06; G06Q 2220/00; G06F 16/2379; H04L 9/0637; H04L 2209/38; H04L 9/3239
USPC .......................................................... 705/30
See application file for complete search history.

(56) References Cited

U.S. PATENT DOCUMENTS

| | | | |
|---|---|---|---|
| 11,069,000 B1* | 7/2021 | Serrano | G06Q 20/0855 |
| 2020/0184556 A1* | 6/2020 | Cella | G06N 20/00 |
| 2021/0185091 A1* | 6/2021 | Cage | H04L 63/10 |

* cited by examiner

*Primary Examiner* — Garcia Ade
(74) *Attorney, Agent, or Firm* — Millen, White, Zelano & Branigan, PC; Ryan Pool

(57) ABSTRACT

A system including a presentational layer with a graphical participant interface which receives data from a participate and passes said data to a workflow engine, a business logic layer including a computer processor, where the business logic layer receives payload data from said workflow engine and sends encrypted payload data to the data layer, and a data layer which includes a storage medium or combination of storage mediums including a blockchain, wherein said data layer receives encrypted payload data from said business logic layer and stores said encrypted payload data on the blockchain and on a shadowing relational database.

The system generates dynamic accounting and bookkeeping methodologies without the use of a ledger by sequencing activity records of associated transaction participants, authorization provided to complete a transaction, and supporting documentation and processing them through a rule-based workflow engine.

9 Claims, 3 Drawing Sheets

PATH OF FUNDS BLOCKCHAIN SYSTEM

BACKGROUND

This invention relates to financial technology. To be more specific, this invention pertains to the application of block chain technology to financial activity.

A participant is defined as any entity which interacts with the system. In some embodiments, participants are divided into participant categories. The preferred embodiments of the system may include any combination of the following exemplary participant categories: bank, depository institution, investor, fund, business entity, donor, vendor, escrow administrator, service provider, charity, etc.

Control account agent is defined as an independent third party who may function to confirm that the conditions of a control account are/have been met. For example, a control account agent could be an escrow account and/or an Escrow Agent. In the preferred embodiments control account agent may be a depository institution, for example, a bank. In some embodiments, the control account agent may be an unrelated party who does not function as a holder of the funds.

A control account is an account with conditions applied to it, for example, escrow account or disbursement account.

A non-control account is an account without conditions applied to it, for example, a checking account.

Depository institution is defined as the entity which holds funds on deposit.

Account administrator is defined as a bank account administer able to administer, for example, an escrow account, disbursement account, and/or an operating account.

Offeror is defined as a fund or other issuing entity that creates a financial offering. A financial offering is defined as a solicitation of capital with a description of how that capital is going to be used.

Project is defined as a project or business that receives funds from the offeror.

Investor or contributor is defined as an individual or organization that contributes funds to the Offeror and is the signer to the offering documents.

Vendor is defined as a service provider to any participant type.

Offeror decision maker is an entity with authority to make decisions on behalf of the Offeror.

Project decision maker is an entity with authority to make decisions on behalf of the project.

SUMMARY OF THE INVENTION

The present invention is directed to a computer-implemented method and apparatus which interconnects investors, funds, banks and service providers through permissioned distributed ledger blockchain technology recording all investment activity and participant interaction throughout a fund's project lifecycle.

This invention utilizes the processing of and maintaining a financial data state through backtracking and chronologically sequencing branching data streams of financial activity records stored on a blockchain. Investor, bank and service provider activity records on the blockchain are processed through a purpose-built workflow engine enabling accountability, transparency and service automation not possible through a traditional ledgering process.

A path of funds blockchain employs a method and process of chronologically sequencing financial investment event records on a blockchain. These records are used to track the investment process throughout the project lifecycles. Transaction and activity records are processed by a predetermined rule-based workflow engine through which ledger values and participant statuses are derived.

Financial state on a Path Chain enabled host is not stored directly but rather derived by chronologically processing the activity sequentially and calculating the state in real time. A performance state derived this way may be cached in memory or stored in an in-memory data store such as Redis.

Some embodiments are comprised of three layers: the data layer, the presentational layer, and the business logic layer.

Business logic layer is a computer processor which utilizes a rule engine to determine how information is processed and stored. The rule engine comprises predetermined workflows which include at least one step definition which contains at least one payload definition.

Workflows may contain definitions for one or more predetermined series of steps. These steps are sequenced together to define a process. Step definitions contain the necessary arguments to allow the workflow to connect activity directly to other workflows or to specific steps within a sequence.

Workflows are executed when participants interact with the presentational layer. Executing the sequences of workflows as such are referred to as "activity."

For example, a workflow for inputting a participant's information would include a participant first selecting the workflow. In this example, the selection is executed when the participant clicks an internet link which directs them to the onboarding process of the presentational layer. The workflow would then execute a series of steps where the participant input different types of information to define the participant, for example, input personal identifying information of the participant. Each payload within the steps is a specific input or document related to that step, for example, input the address of the participant. The fields provided by the participant during this process are stored in the data layer.

Workflows are comprised of three layers, i.e., step definition layer, sequence definition layer, and payload layer.

In some embodiments, participants of the system interact with the system through a presentational layer which is defined as a graphical participant interface. In some embodiments, the presentational layer is different for each category of participant, for example, in graphical design and/or functionality. Some preferred embodiments use a JavaScript code base language to program the presentational layer, for example, REACT JS.

Business logic layer is a computer processor with a rules engine which defines how the information is handled and stored within the system. The rules engine comprises predetermined workflows each predetermined workflow includes at least one step and each step includes at least one payload. Each workflow, step, and payload is given a separate unique identifier. Unique identifiers are commonly known in the art as, for example, a 128-bit number used to identify information in computer systems. In some embodiments the unique identifier is UUID4.

In some embodiments, a predetermined workflow is selected by a participant in the system. The selection of a predetermined workflow causes the system to execute a series of sequential steps each having its own payload(s) where a payload is a specific activity in a step. For example, a workflow for inputting a participant's information would include a participant first selecting the workflow. The workflow would then execute a series of steps where the participant input different types of information to define the participant, for example, input personal identifying information of the participant. Each payload within the steps is a specific input related to that step, for example, input the address of the participant.

Any of the three layers of the workflow, i.e., workflow layer, steps layer, and payload layer may optionally determine completion conditions. The business logic layer determines whether or not the completion conditions have been satisfied. The workflow may also include conditional rules for addressing participants who have satisfied the conditions of each workflow and who have not satisfied the conditions of each workflow. For example, the workflow may include a rule for the business logic layer to prompt a user to input missing information in a payload after a predetermined period of time or to proceed to the next step in the workflow.

In some embodiments, workflows will conditionally switch into other workflows and/or workflow steps once the business logic layer checks are executed. For example, if an account transfer workflow starts before an account was created; the business logic layer would catch the exception and automatically start the account creation workflow.

In some embodiments, an investor may be required by a workflow to provide identifying information and proof that they satisfy a particular condition; for example, that they have an annual income of above a predetermined threshold value, for example, more than $200,000. The business logic layer identifies that a submission has been made by the participant and applies a unique identifier which identifies that submission and relates it to the workflow for which it was submitted. For example, the business logic layer identifies that the submission contains the investor's identifying information. The business logic layer optionally performs various levels of checks to confirm whether an acceptable level of information is present in accordance with the workflow and optionally checks the veracity of the provided information against predetermined third party databases.

For example, the business logic layer performs various levels of checks to confirm whether the income is above or below the predetermined threshold value of $200,000. The business logic layer also optionally performs various levels of checks to confirm the veracity of the reported income level in the data packet by, for example, checking the information against associated information in a third party database, for example, at the referenced depository institution where the $200,000 is held.

Transaction Conditions may optionally be included on any of the three layers of a workflow. Transaction conditions are conditions which must be satisfied before a transaction can occur. The business logic layer recalls documents summited to system using the Unique Identifier and matches these documents with the transaction condition the document satisfies. The business logic layer optionally performs various levels of checks to confirm the veracity of the document. In some embodiments, where there is an objective standard for determining the veracity of a document, the system performs a check of the veracity.

Once the transaction conditions have been met the business logic layer processes the transaction and uploads the record of the transaction with accompanying documents which allowed the transaction to occur to the block chain. The transaction is assigned a unique identifier by the system.

An infrastructural Layer comprises a relational database and a Private Blockchain Database.

In some embodiments, the relational database uses a PostgreSQL object-relational database management system with an emphasis on extensibility and standard compliance. PostgreSQL may be advantageous because it lends itself to the process most efficiently as it is open source and supports a JSONB data type. In some embodiments, other SQL databases which support the technology stack, such as Oracle, could be used.

A private Blockchain Database optionally uses Hyperledger Fabric framework for implementation. Private Blockchain Database is a digital database which records financial transactions information where the database is immutable and verifiable. Private blockchains may optionally be used for financial records or financial transactions. The Private Blockchain Database uses a combination of data encryption and cryptographic hashing for protection of the data stored within. In some embodiments the cryptographic hash is SHA, preferably SHA-256. The Private Blockchain Database is structured as sequences of blocks of data where each block contains a predetermined limited amount of data. The blocks are organized in Merkle trees to verify that all blocks are in the order that they should be in.

Hyperledger Fabric leverages container technology to host smart contracts called Chaincode that creates transactions among the relational database. In some embodiments, the transaction records that are stored on the relational databases are only used to shadow the blockchain.

In some embodiments, documents uploaded to the system by participants are held in storage, for example, cloud storage or locally hosted storage.

In some embodiments, a document provided to the system by a participant is processed in the following manner:

The participant provides the document to the system in response to a workflow request, for example, by scanning the document and/or uploading a digital copy of the document through the presentation layer. In some embodiments, a third party digital document signing service provider may be utilized. The presentation layer communicates with the business logic layer which processes the document transaction according to the workflow requirements by applying a unique identifier. Once the workflow involving that particular document has been completed, the transaction and its accompanying documents are recorded in both the relational database and Blockchain where the data in the blockchain is further protected by a cryptographic hash. The business logic layer optionally pushes the document image to storage with the associated unique identifier attached to the document image. In some embodiments, it is a hash of the document file that is stored. This allows for use of the file hash to certify its authenticity if/when reproduced.

In some embodiments, the Participant can use the Presentation Layer to access data from either database by using the unique identifier and cryptographic hash where appropriate.

In some embodiments, each participant of the system registers with the system. For example, the participant, through the presentation layer, completes know your customer information and uploads supporting documentation, which is processed by the business logic layer. know your customer refers to the process of verifying the identity of clients and assessing potential risks of illegal intentions for the business relationship. The term, know your customer, as used herein refers to how it is used in bank regulations and anti-money laundering regulations which govern these activities.

The participant provides a combination of transactional and non-transactional information. The transactional and non-transactional information is processed at the business layer. Participant transactional information is given a unique identifier and recorded in the relational database. When a participant is involved in a transaction, the record of that transaction as well as the relevant participant identifying information is encrypted with a cryptographic hash and recorded on the Blockchain. Participant non-transactional information is encrypted and recorded in the relational database.

In some embodiments, the depository institution is linked to the system through an authorized access layer which connects to the business logic layer for processing information. Once the business logic layer satisfies a workflow to justify a transaction to occur, the necessary information collected by the workflow are provided to the depository institution which executes the transaction and provides a record of the transaction to the business logic layer. The record of that transaction is then given a unique identifier and cryptographic hash and recorded on the relational database and the blockchain. In some embodiments, records on the blockchain and relational database are identical in both content and encryption.

For example, the business logic layer optionally sends the transactional information to the depository institution for acceptance. Once the business logic layer receives an approval from a control account from the depository institution's access layer, the business logic layer will then send encrypted confirmed transactional information to the private blockchain database. The confirmed non-transactional information is recorded in the relational database with the associated unique identifier. In non-control accounts the transaction is optionally pushed to the private blockchain database upon completion.

The embodiments of the invention replace traditional general ledgers and traditional subledgers with a procedurally generated non-ledgered sequencing of transaction data and activity data. A problem with traditional ledgering occurs when organizations which employ one or more subledgers and entries to the ledger(s) are further understood by non-numerical entries (i.e. contracts, supporting documentation, and images). As a traditional ledger grows, the process of combining and auditing the general ledger and sub ledgers and associated supporting documentation increases the complexity of the task. This limits the usefulness of traditional ledgers in "real time" applications where the complexity of the ledgering requirement adjusts and increases dynamically.

An advantage of the embodiments herein is that it allows for more complex accounting than traditional ledger types and connects accounting records with the associated transaction participants, authorization(s) provided to complete a transaction, and supporting documentation (i.e. contracts and agreements related to a transaction). In the embodiments herein, general ledgers and subledgers are replaced with branching interconnected activity records. This allows for a much more efficient interdisciplinary processes, e.g., accounting, legal, and operations, in situations where financial activity is contingent upon terms and conditions defined in documentation, and the actions of multiple transaction participants.

The embodiments herein allow for more complex accounting operations such as when accounting methods are dependent on contingent events. For example, when distribution of money between participants must be adjusted in "real time" as participants modify, conditionally finalize, and finalize agreements. The embodiments herein have the added ability to define, record, and enforce more complex rules that affect the accounting process than compared with the rules understood and recorded by a traditional ledger and subledger(s). For example, when a participant agreement requires adapting the accounting method on conditions such as the number of investors, the time of investment, the order of investment, the total amount invested, the total amount invested per individual investor, or any combination thereof.

Existing blockchains such as Etherium, Bitcoin and Hyperledger Fabric are so dependent on a core ledger that the term "distributed ledger" is colloquially synonymous with "blockchain." This ledger dependence requires traditional blockchains to store a copy of the ledger on every node on the network. This makes the use of dynamic accounting methods necessary to facilitate complex fund administration extremely inefficient in comparison to the embodiments herein.

DETAILED DESCRIPTION OF THE DRAWINGS

Figure 1:
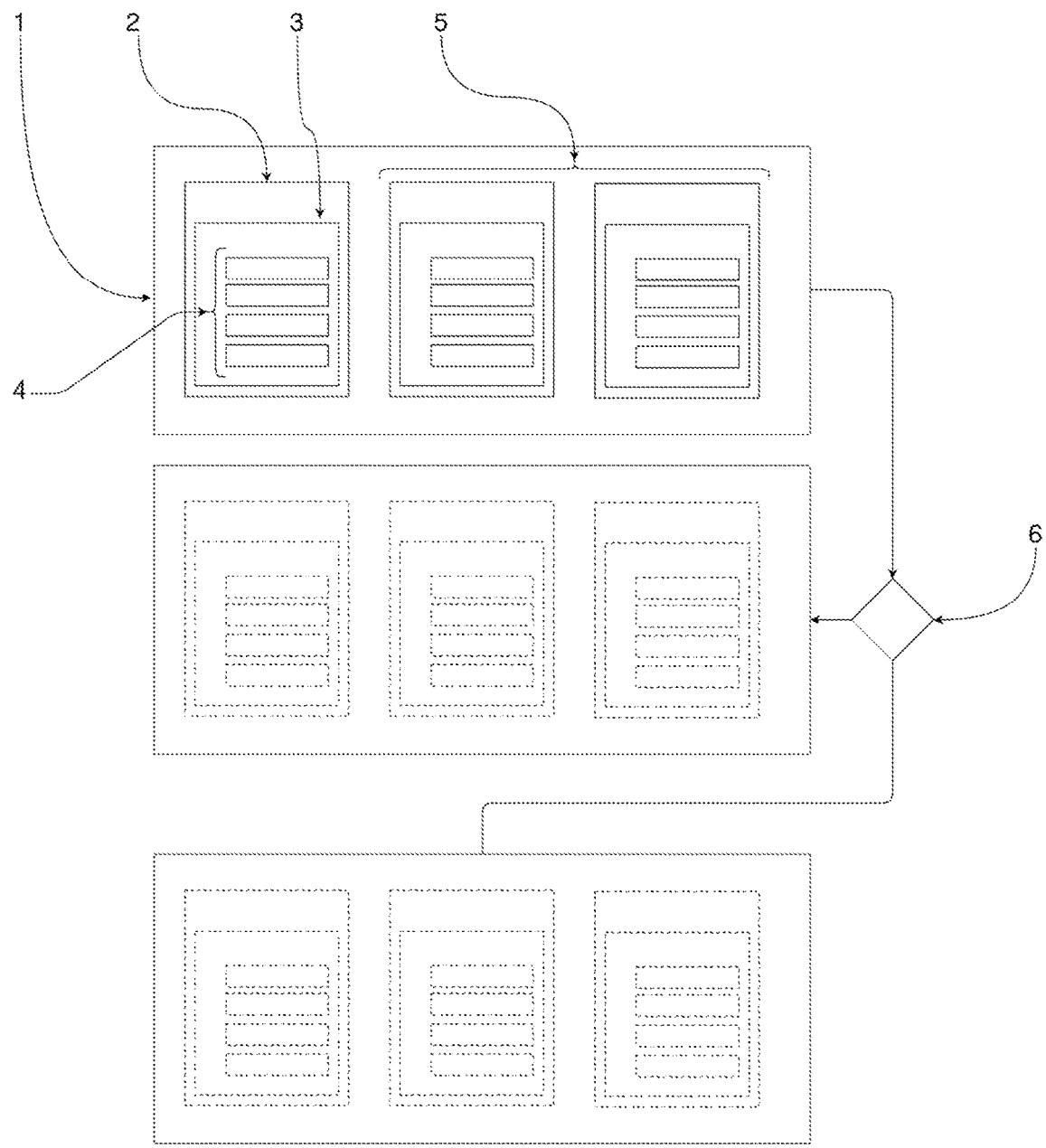
FIG. 1 is a graphical representation of how workflows contains a sequence of steps wherein the points of interaction are defined and how input determines the order in which steps execute.

FIG. 1 shows workflows (1) which is an abstract container which groups the step definitions and defines the sequential order of the contained steps (2). These steps (2) are a definitional layer which contains a set of payload definitions and requirements for each point of interaction. Each workflow step may also contain conditions (6) which route to other steps by evaluation input received during the interaction process (see FIG. 1: 6).

A payload (3) is a definitional layer which defines form field and document requirements for each point of interaction which collectively form a payload definition. A field (4) is a definitional layer which defines the input or document type and the requirements for each field during the interaction process.

In some embodiments, default workflows (5) are executed sequentially as a workflow process completes from one step to the next. Each workflow may optionally contain conditions (6) which alter the order of operations between any step based on the inputs received during the interaction process. Activity can be routed to any step in any workflow based on the condition definitions.

Figure 2:
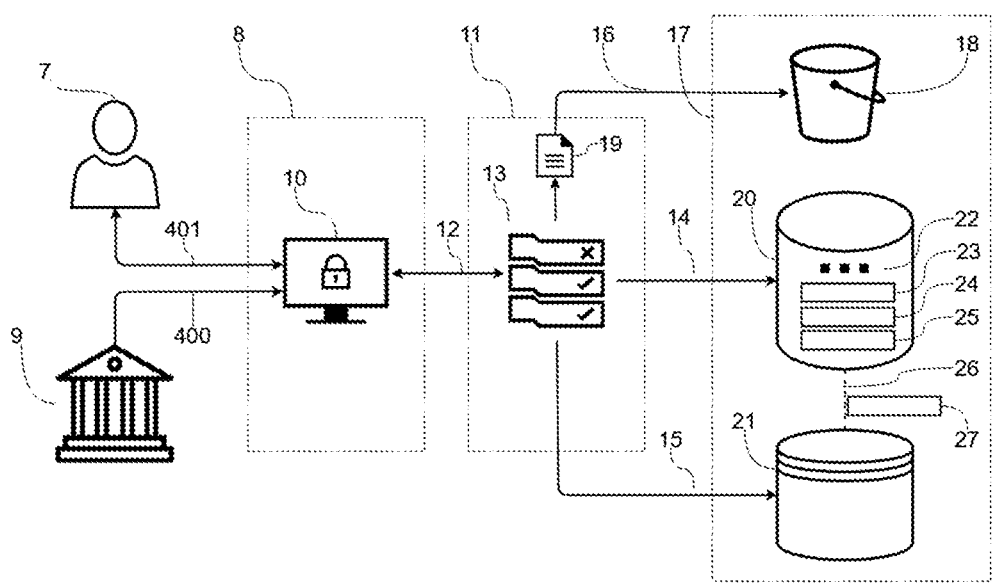
FIG. 2 is an example of the processing of a transaction request as initiated by a participant on the presentational layer.

FIG. 2 shows the processing of a transaction request as initiated by a participant on the presentational layer.

An authenticated participant (7) initiates a transaction through the presentation layer (8) using an interaction process (401). The presentational layer (8) passes the transaction request to the workflow engine (10).

A depository institution (9) is notified of the request via API (400 and 402). The business logic layer (11) evaluates veracity of the request, encrypts the payload data and commits the record to the data layer (17). Accompanied documents (19) are processed, encrypted and saved in a secure cloud storage environment (18) which may optionally be encrypted cloud storage. Data not related directly to the transaction request (12) such as ephemeral two factor authentication codes are stored within a relational database (21), for example, SQL database.

Once the veracity of the transaction request is confirmed by the business logic layer the transaction request block (24) is committed to the blockchain (20).

Encrypted transaction request records (26) are passed directly to the shadowing relational database (21), for example, SQL database for performance optimization and reconciliation.

Chain code (18) is a programmable business logic that exists directly within the blockchain. Chain code is executable code that executes within the blockchains themselves. A major problem with traditional blockchains is that chain code is in large part used as a crutch to execute business logic for the purpose of updating the ledger. This means that in the event of a complicated accounting method, if the product of the chain code's execution affects the ledger, the material change returned from the execution of the change code would have to be propagated to all of the nodes on the network. This is a major inefficiency that is mitigated by the embodiments described herein because the chain code is never used for the purpose of ledgering. Rather it is used for rule enforcement, fraud detection and auditing.

In some embodiments the chain code would be written in the Go programming language. Chain code can be called and executed directly from the blockchain before any records are committed to it. Chain code would be used to evaluate the veracity of the record before committing it, modifying the record based on optional predefined rules programmed into the chain code, notifying if a record triggers a fraud detection rule defined in the business logic or an audit condition rule defined in the business logic.

Prior block (23) and SHA-256 hash (22) are collected for payloads (3) and any submitted documents. A transaction request block (24) is committed with prior block's SHA-256 hash (22). Subsequent blocks (25) commit the transaction with the transaction request block's SHA-256 hashes (23). An encrypted transaction request record (27) is sent to the shadowing relational SQL database (21) for performance optimization and reconciliation.

The business logic layer (11) optionally performs various levels of checks to confirm the veracity of fields and documents provided throughout the interaction process. In some embodiments, where there is an objective standard for determining the veracity of a document, the system performs a check of the veracity.

Once the transaction conditions have been met the business logic layer (11) processes the transaction request record (14) and passes the transaction request record (14) to the data layer (11). The business logic layer (11) generates a SHA-256 hash (23) of the document and commits the generated hash with the accompanying record to the blockchain (20). Accompanying documents are stored in the cloud-based document storage environment (18). The transaction is assigned a unique identifier by the system.

Transaction conditions may optionally be included on any of the three layers of a workflow (1). These transaction conditions are conditions which must be satisfied before a transaction can occur. The business logic layer (11) recalls documents submitted to the system using the Unique Identifier and matches these documents with the transaction condition the document satisfies.

The Data layer (17) is a storage medium or combination of storage mediums which commit the activity records to storage. Each step having payload definitions where a payload (3) contains the respective values as provided through activity for the defined payload in a step.

For example, input fields provided by participants during the interaction process may be stored as JSON objects as a record in a blockchain data store such as Hyperledger Fabric or a relational SQL database (21) such as PostgreSQL. Payloads (3) may be stored exclusively on the blockchain (20), exclusively on a relational SQL database (21), or mirrored on both. Multiple data storage mediums may be used for the purpose of reconciliation.

In some embodiments, the relational database uses a PostgreSQL object-relational database management system with an emphasis on extensibility and standard compliance. PostgreSQL may be advantageous because it lends itself to the process most efficiently as it is open source and supports a JSONB data type. In some embodiment, other SQL databases (21) which support the technology stack such as Oracle could be used.

Presentation layer (8) is the portion of the system in which participants interact with the system. In some embodiment, participants of the system interact with the system through a presentational layer (8) which is defined as a graphical participant interface. In some embodiments, the presentational layer (8) is different for each category of participant, for example, in graphical design and/or functionality. Some embodiments use a JavaScript code base language to program the presentational layer, for example, REACT JS. In some embodiments, the method of interaction for some category of participants may require an Application Programming Interface.

In some embodiments, the Participant can use the presentation layer (8) to access data from either database by using the unique identifier and cryptographic hash where appropriate. In some embodiments, each participant of the system registers with the system. For example, the participant, through the presentation layer (8), completes know your customer information, uploads supporting documentation, which is processed by the business logic layer.

Know Your Customer refers to the process of verifying the identity of clients and assessing potential risks of illegal intentions for the business relationship. The term as used herein is used as referred to in bank regulations and anti-money laundering regulations which govern these activities.

The participant provides a combination of transactional and non-transactional information. The transactional and non-transactional information is processed at the business layer. Participant transactional information is given a unique identifier and recorded in the relational database. When a participant is involved in a transaction, the record of that transaction (14) as well as the relevant participant identifying information is encrypted and recorded on the Blockchain (20) with an accompanying cryptographic hash of the transaction details. Participant non-transactional information is encrypted and recorded in the relational database (21).

In some embodiments, the depository institution (9) is linked to the system through an authorized access layer (10) which connects to the business logic layer (11) for processing information.

Once the business logic layer (11) satisfies a workflow (1) to justify a transaction to occur, the necessary information collected by the workflows (1) are provided to the depository institution (9) which executes the transaction and provides a record or copy of the record of the transaction (24) to the business logic layer (11). These are generated prior to committing them to the blockchain (20). In some embodiments, records on the blockchain (20) and relational database (21) are identical in both content and encryption.

For example, the business logic layer (11) optionally sends the transactional information to the depository institution (9) for acceptance. Once the business logic layer (11) receives an approval from a control account from the depository institution's (9) access layer, the business logic layer (11) will then send encrypted confirmed transactional information (24) to the private blockchain database (20). The confirmed non-transactional information is recorded in the relational database (21) with the associated unique identifier. In non-control accounts the transaction is optionally pushed to the private blockchain database (20) upon completion.

Figure 3:
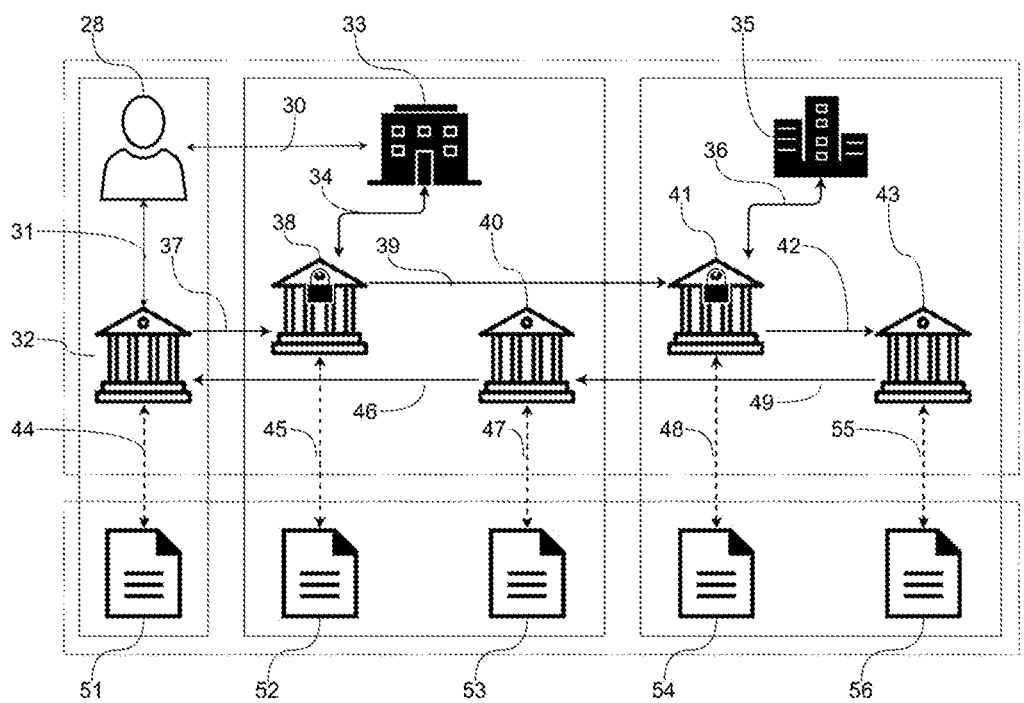
FIG. 3 is an overview of the movement of information in the system.

FIG. 3 is an overview of the movement of information in the system.

The investor (28) receives an investment solicitation and offer, as well as other supporting documentation (30) from a Primary Entity (33) through the presentational layer (8). Next, the investor (28) submits the final executed agreement (30) back to the Primary Entity (33) for its approval (30). The investor (28) initiates the fund transfer amount and transfer authorization information (37) to the Primary Entity's bank account (38), along with the necessary fund transfer amount and transfer authorization information (37), the Primary Entity (33) receives a funds transfer notification and deposit notification (34) from the Investor (28) as well as a funds transfer notification and deposit notification (34) from the Primary Entity's Bank (38). The Primary Entity's Bank (38) receives an immediately acknowledgement of the fund transfer request (37) made by the Investor's Bank (32). The Primary Entity's Bank (38) returns a notification summary of deposit (34) to the Primary Entity (33).

When the Primary Entity's bank (38) account is considered a controlled account and requires number of signatory approvals, the presentational layer (8) streamlines the digital certification process as well as coordinates with other independent signers needed to meet the Primary Entity's Bank (38) approval.

The monetary and informational exchange between the Investor (28), the Primary Entity (33) and the Primary Entity's Bank (38) are then time stamped and the transactional details, with supporting documentation, are assembled and encapsulated into a chronological order as a Pathchain record. In this example the sequence is as follows; (44, 51 & 45, 52).

Next, the Primary Entity (33) initiates a fund transfer (34) to its related or Secondary Entity's Bank account (41), along with the necessary transfer authorization credentials. The Secondary Entity (35) receives the fund transfer notification (36) from the Primary Entity's Bank (38) as well as a deposit notification (36) from the Second Entity's Bank (41). Once the Secondary Entity's Bank (41) acknowledges the fund transfer request (39) made by the Primary Entity's Bank (38), the Secondary Entity's Bank (41) sends a notification summary of the deposit (36) to the Secondary Entity (35).

When the Second Entity's Bank account (41) is a controlled account in which certain multiple signers are needed to meet bank approval, digitally certification and instant bank approval is provided through the presentational layer (8).

The informational exchange with Primary Entity (33), Primary Entity's Bank (38), Secondary Entity (35) and Secondary Entity's Bank (41) are time stamped and the transactional details, with supporting documentation, are assembled and encapsulated into a chronological order as a Pathchain record. In this example the sequence is as follows; (45, 52 & 48, 54).

Some embodiments include a system including:
at least three layers comprising a presentational layer, a business logic layer, and a data layer,
wherein said presentational layer comprises a graphical participant interface which receives data from a participate and passes said data to a workflow engine,
wherein said business logic layer comprises computer processor, wherein the business logic layer receives payload data from said workflow engine and sends encrypted payload data to the data layer, and
wherein said data layer comprises a storage medium or combination of storage mediums including a chain code blockchain, wherein said data layer receives encrypted payload data from said business logic layer and stores said encrypted payload data on the chain code blockchain and on a shadowing relational database,
wherein the system generates dynamic accounting and bookkeeping methodologies without the use of a ledger by sequencing activity records of associated transaction participants, authorization provided to complete a transaction, and supporting documentation and processing them through a rule-based workflow engine.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A system comprising:
at least three layers comprising a presentational layer, a business logic layer, and a data layer,
wherein said presentational layer comprises a graphical participant interface which receives data from a participant and passes said data to a workflow engine and defines a transaction condition along with a unique identifier,
wherein said business logic layer comprises a computer processor, wherein the business logic layer
receives payload data with at least one document from said workflow engine,
confirms that the transaction condition is met,
encrypts the payload data,
generates a hash of the at least one document, and
sends the encrypted payload data, the hash of the at least one document, and the at least one document along with the unique identifier to the data layer, and
wherein said data layer comprises a storage medium or combination of storage mediums including a blockchain, wherein said data layer receives encrypted payload data from said business logic layer and stores said encrypted payload data and the hash of the at least one document on the blockchain and also stores the at least one document on a shadowing relational database along with the unique identifier,
wherein the system generates dynamic accounting and bookkeeping methodologies without use of the blockchain by sequencing activity records of associated transaction participants, authorization provided to com- plete a transaction, and supporting documentation and processing them through a rule-based workflow engine, and wherein the business logic layer is configured to recall the at least one document from the shadowing relational database using the unique identifier and matches the at least one document with the transaction condition.

2. The system of claim 1 wherein the shadowing relational database is an SQL database.

3. The system of claim 1 wherein the blockchain comprises chain code.

4. The system of claim 3 wherein the chain code evaluates said encrypted payload data received by the data layer according to rules defined in the business logic layer and either commits said encrypted payload data to the blockchain, modifies the encrypted payload data, generates a fraud detection notification, or generates an audit condition notification.

5. The system of claim 1 wherein the business logic layer performs checks of the received payload data to confirm the veracity of fields and documents provided.

6. The system of claim 1 wherein business logic layer generates a SHA-256 hash of the payload data and commits the generated hash with the accompanying record to the blockchain.

7. The system of claim 1 wherein the business logic layer includes a rules engine which defines how the information is handled and stored within the system.

8. The system of claim 7 wherein the rules engine rules engine comprises predetermined workflows wherein each predetermined workflow includes at least one step and each step includes at least one payload.

9. The system of claim 8 wherein each workflow, step, and payload is given a separate unique identifier.

* * * * *